(12) United States Patent
Charbit

(10) Patent No.: US 7,990,932 B2
(45) Date of Patent: Aug. 2, 2011

(54) APPARATUS, METHOD AND COMPUTER PROGRAM PRODUCT PROVIDING INITIAL CELL ACQUISITION AND PILOT SEQUENCE DETECTION

(75) Inventor: Gilles Charbit, Farnborough (GB)

(73) Assignee: Nokia Corporation, Espoo (FI)

( * ) Notice: Subject to any disclaimer, the term of this patent is extended or adjusted under 35 U.S.C. 154(b) by 543 days.

(21) Appl. No.: 11/990,033

(22) PCT Filed: Aug. 22, 2006

(86) PCT No.: PCT/IB2006/002283
§ 371 (c)(1),
(2), (4) Date: Feb. 4, 2008

(87) PCT Pub. No.: WO2007/023359
PCT Pub. Date: Mar. 1, 2007

(65) Prior Publication Data
US 2010/0098031 A1  Apr. 22, 2010

(51) Int. Cl.
*H04J 3/06* (2006.01)
(52) U.S. Cl. ......... 370/336; 370/347; 370/294; 370/204
(58) Field of Classification Search ............... 370/336, 370/203, 208, 342
See application file for complete search history.

(56) References Cited

U.S. PATENT DOCUMENTS

| 7,496,113 | B2 * | 2/2009 | Cai et al. ............. | 370/474 |
|---|---|---|---|---|
| 2003/0072255 | A1 * | 4/2003 | Ma et al. ............. | 370/208 |
| 2004/0085946 | A1 * | 5/2004 | Morita et al. ......... | 370/342 |
| 2005/0226140 | A1 * | 10/2005 | Zhuang et al. ........ | 370/203 |
| 2008/0151839 | A1 * | 6/2008 | Litwin et al. .......... | 370/336 |

OTHER PUBLICATIONS

"Novel TEchnique for Co-channel interference Measurements in cellular network" by Sergey Dickey,Oct. 2003.*
Kim, K.S. et al., "A Preamble-Based Cell Searching Technique for OFDM Cellular Systems", © 2003, IEEE, pp. 2471-2475.
Lee, J-W. et al., "Rapid Cell Search in OFDM-Based Cellular Systems", © 2005, IEEE, 5 pgs.
3GPP TSG RAN WG 1 Ad Hoc on LTE, R1-050590, "Physical Channels and Multiplexing in Evolved UTRA Downlink", Sophia Antipolis, France, Jun. 20-21, 2005, 24 pgs.

* cited by examiner

*Primary Examiner* — Dang T Ton
*Assistant Examiner* — Pamit Kaur
(74) *Attorney, Agent, or Firm* — Harrington & Smith

(57) ABSTRACT

Disclosed herein are apparatus, methods and computer program products for performing cell acquisition and pilot sequence detection in a cellular telecommunications system such as, for example, an OFDM system. In the apparatus, methods and computer program products, a primary synchronization channel sequence and a secondary synchronization channel sequence are transmitted by a base station in a subframe of an OFDM downlink frame. In one embodiment, the primary synchronization channel sequence, secondary synchronization channel sequence, and system information are mapped to a plurality of sub-carriers in an FDM signal. At the user equipment, coarse synchronization is performed during cell acquisition by performing a cross correlation between the signal and a reference primary synchronization channel sequence stored in a memory of the user equipment. The coarse synchronization performed using the primary synchronization channel sequence is improved by performing a cross correlation between the signal and a reference secondary synchronization channel sequence stored in a memory of the user equipment. Identification of a pilot sequence for channel estimation purposes is performed by detecting two cyclically invariant pairs of secondary synchronization channel sequences over two consecutive frames of the signal. The cyclically invariant pair of secondary synchronization channel sequences are selected from a set of orthogonal sequences and identify a particular pilot sequence incorporated in the signal.

32 Claims, 10 Drawing Sheets

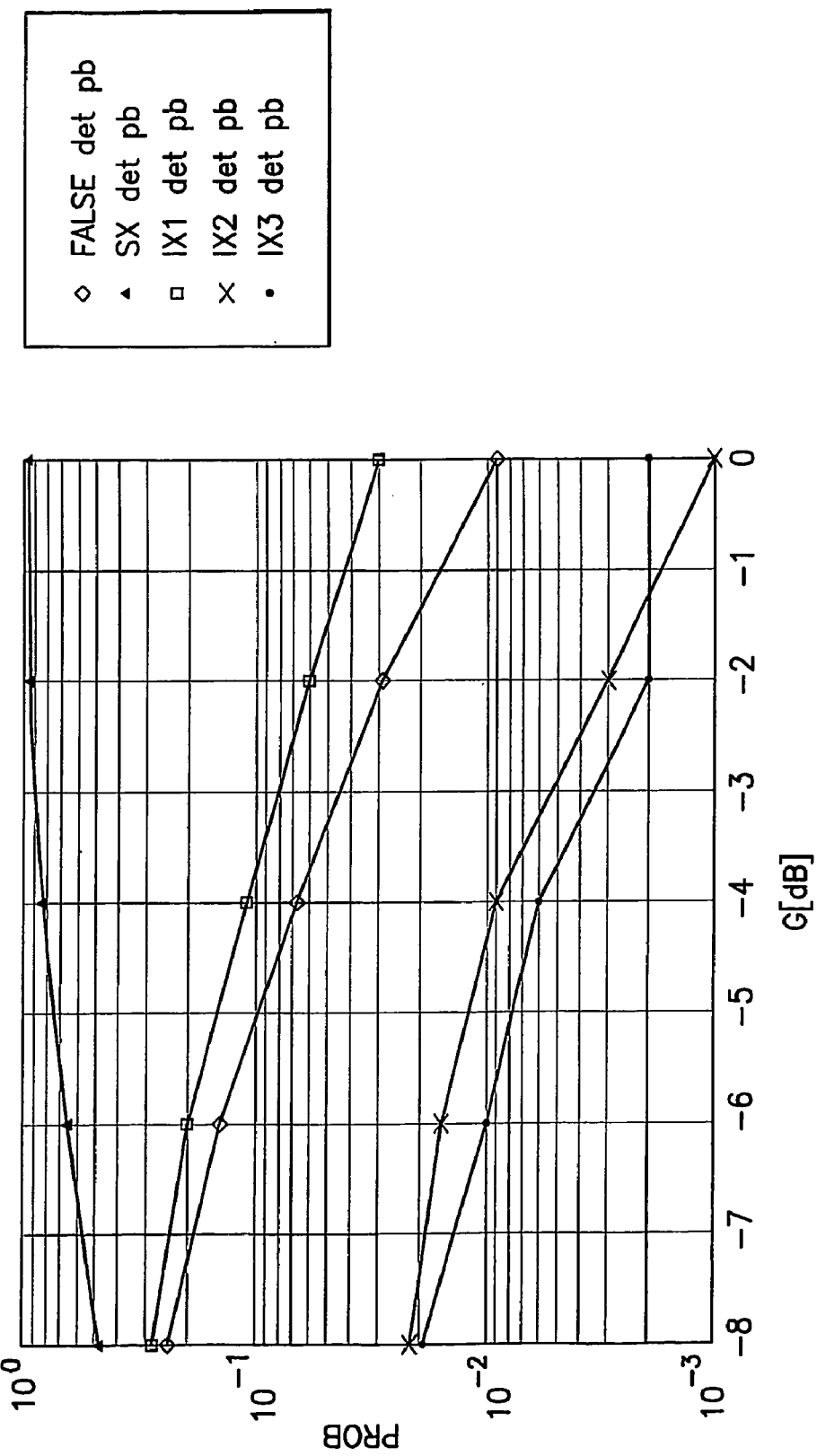

US 7,990,932 B2

APPARATUS, METHOD AND COMPUTER PROGRAM PRODUCT PROVIDING INITIAL CELL ACQUISITION AND PILOT SEQUENCE DETECTION

TECHNICAL FIELD

The exemplary and non-limiting embodiments of this invention generally concern apparatus and methods for use in wireless communications systems, and more specifically concern apparatus and methods for performing initial cell acquisition and pilot sequence detection in digital cellular communication systems.

BACKGROUND

The following abbreviations that appear in the ensuing disclosure are defined as follows:
3GPP Third Generation Partnership Project
3.9G Long Term Evolution UTRAN
BS base station (referred to as Node B in some systems)
DL down link
DRX discontinuous reception
DSP digital signal processors
FDM frequency division multiplexed
HW hardware
FFT fast fourier transform
LTE Long Term Evolution
OFDM orthogonal frequency division multiplexing
PSCH primary synchronization channel
RAN radio access network
RNC radio network controller
SSCH secondary synchronization channel
SW software
UE user equipment
UTRAN Universal Terrestrial Radio Access Network Orthogonal Frequency Division Multiplexing has been proposed in 3GPP for DL LTE UTRAN. Reference in this regard may be had to "Principles for the Evolved UTRA radio access concept", Alcatel, Ericsson, Fujitsu, LGE, Motorola, NEC, Nokia, DoCoMo, Panasonic, RITT, Samsung, Siemens, WG1 Ad Hoc on LTE UTRA, R1-050622, Sophia Antipolis, France, 20-21 Jun. 2005. A frame containing a preamble was outlined in 3GPP (see "Physical Channels and Multiplexing in Evolved UTRA DL", NTT DoCoMo, WG1 Ad Hoc on LTE UTRA, R1-050590, Sophia Antipolis, France, 20-21 Jun. 2005).

Initial cell acquisition requires time and frequency synchronization at user equipment prior to computation of receiver algorithms. A cell/sector specific pilot sequence needs to be identified to allow channel estimation and channel equalization. Furthermore, practical algorithms (at least in terms of processing complexity) to estimate and correct timing and carrier offset for cell acquisition are required before receiver algorithms can be processed. However, the cell-specific pilot sequence is unknown during the initial cell acquisition stage. A robust mechanism is needed to detect the pilot sequence for channel estimation.

SUMMARY OF EMBODIMENTS OF THE INVENTION

A first embodiment of the invention comprises a method. In the method user equipment receives in a downlink channel of a cellular telecommunications system a signal comprising a plurality of frames, with each frame comprised of a plurality of sub-frames. At least one sub-frame of each frame comprises a primary synchronization channel sequence and a secondary synchronization channel sequence. The signal further comprises a pilot sequence. The user equipment uses the primary synchronization channel sequence contained in the signal to perform coarse synchronization with a cell having a base station transmitting the signal. The user equipment next uses the secondary synchronization channel sequence contained in the signal to improve the coarse synchronization achieved with the primary synchronization channel sequence. Then, the user equipment determines the pilot sequence incorporated in the signal; and uses the pilot sequence to perform channel estimation.

A second embodiment of the invention is user equipment comprising: an RF transceiver for receiving a signal; a memory configured to store a program and reference primary and secondary synchronization channel sequences; a data processor coupled to the RF transceiver and the memory, the data processor configured to execute the program; and a signal processing unit, wherein the signal processing unit is adapted to perform signal processing operations. The signal processing operations comprise: receiving a signal comprising a primary synchronization channel sequence, a secondary synchronization channel sequence, and a pilot sequence; using the primary synchronization channel sequence to perform coarse synchronization with a cell having a base station transmitting the signal; using the secondary synchronization channel sequence to improve the coarse synchronization achieved with the primary synchronization channel sequence; determining the pilot sequence incorporated in the signal; and using the pilot sequence to perform channel estimation.

A third embodiment of the invention comprises a memory medium tangibly embodying a computer-readable program, the program adapted to perform operations when executed by a digital processing apparatus. The operations performed by the digital processing apparatus when the program is executed comprise: receiving a signal comprising a plurality of frames at a user equipment, with each frame comprised of a plurality of sub-frames, wherein at least one sub-frame of each frame comprises a primary synchronization channel sequence and a secondary synchronization channel sequence, the signal further comprising a pilot sequence and information identifying the pilot sequence; performing a sliding cross correlation in a time domain between the signal and a reference primary synchronization channel sequence stored in a memory of the user equipment to effect a coarse synchronization between the user equipment and a cell containing a base station transmitting the signal; performing a sliding cross correlation in a frequency domain between the signal and a reference secondary synchronization channel sequence stored in the memory of the user equipment to improve the coarse synchronization achieved with the reference primary synchronization sequence; using the information identifying the pilot sequence to determine the pilot sequence incorporated in the signal; and using the pilot sequence to perform channel estimation.

A fourth embodiment of the invention is a base station, the base station comprising: an RF transceiver for transmitting signals in a cellular telecommunications system; a memory for storing a program; and a data processor for executing the program, wherein when the program is executed operations are performed. The operations comprise: transmitting a signal, wherein the signal comprises a plurality of frames, with each frame comprised of a plurality of sub-frames, wherein at least one sub-frame of each frame comprises a primary synchronization channel sequence and a secondary synchronization channel sequence, the signal further comprising a pilot sequence and information identifying the pilot sequence. The information identifying the pilot sequence comprises a cyclically invariant pair of secondary synchronization channel sequences transmitted in consecutive frames.

A fifth embodiment of the invention comprises signal processing circuitry for use in user equipment, the signal processing circuitry adapted to perform signal processing operations, the signal processing circuitry comprising: an input adapted to receive a signal, the signal comprising a plurality of frames, with each frame comprised of a plurality of sub-frames, wherein at least one sub-frame of each frame comprises a primary synchronization channel sequence and a secondary synchronization channel sequence, the signal further comprising a pilot sequence and information identifying the pilot sequence; a circuit coupled to the input and adapted to perform a sliding cross correlation in a time domain between the signal and a reference primary synchronization channel sequence stored in a memory of the user equipment to effect a coarse synchronization between the user equipment and a cell containing a base station transmitting the signal; a circuit coupled to the input and adapted to perform a sliding cross correlation in a frequency domain between the signal and a reference secondary synchronization channel sequence stored in the memory of the user equipment to improve the coarse synchronization achieved with the reference primary synchronization sequence; a circuit adapted to use the information identifying the pilot sequence to determine the pilot sequence incorporated in the signal; and a circuit adapted to use the pilot sequence to perform channel estimation.

BRIEF DESCRIPTION OF THE DRAWINGS

The foregoing and other aspects of these teachings are made more evident in the following Detailed Description, when read in conjunction with the attached Drawing Figures, wherein:

FIGS. 5A-5D are graphs that illustrate the result of simulations employing the exemplary embodiments of this invention;

DETAILED DESCRIPTION

Figure 1:
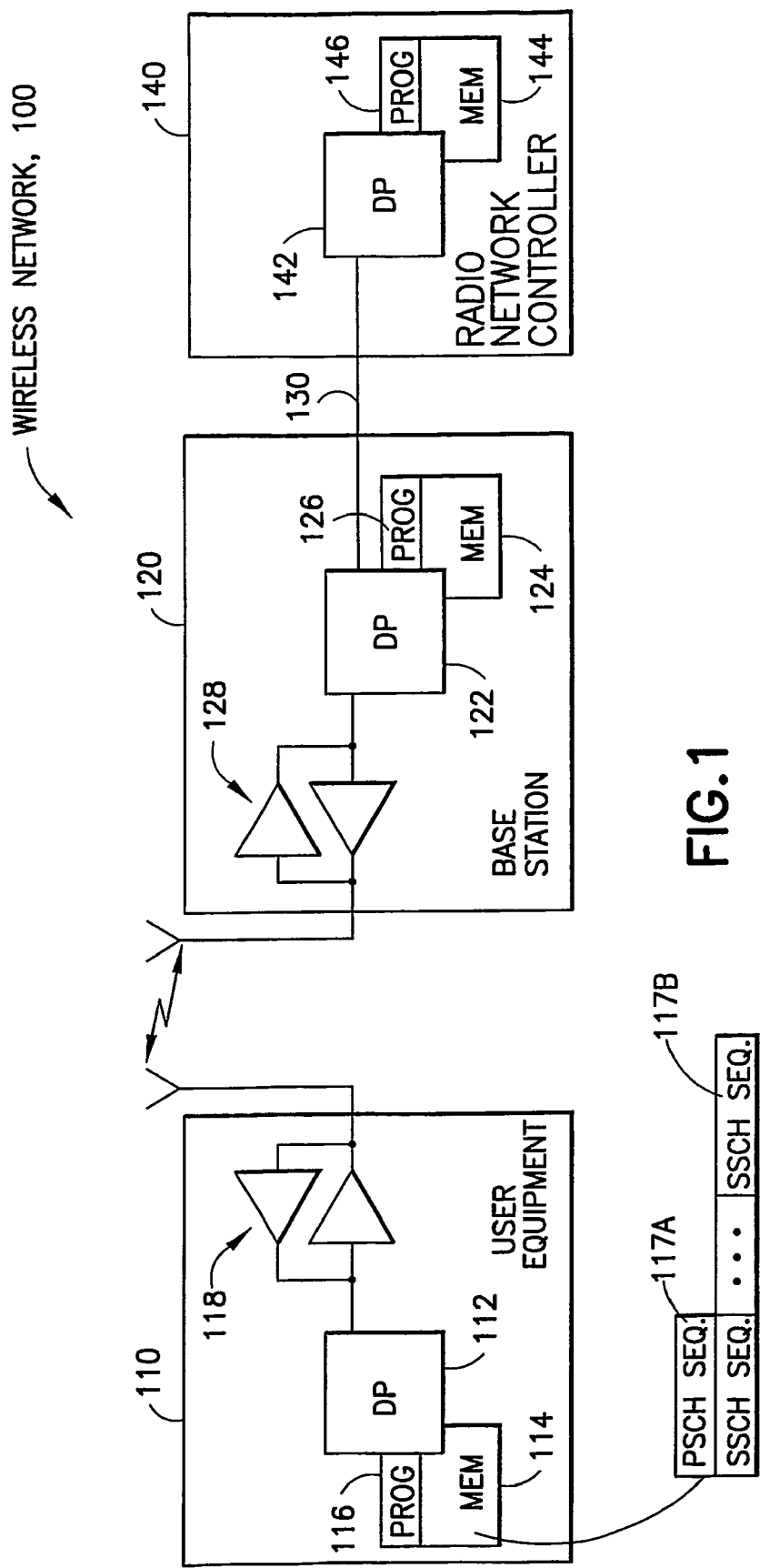
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 100 includes a user equipment 110, a base station 120 and a further network element or elements, such as a Radio Network Controller RNC 140. The user equipment 110 comprises a data processor 112, a memory 114 that stores a program 116, and a suitable radio frequency (RF) transceiver 118 for bidirectional wireless communications with the base station 120. The base station 120 also includes a data processor 122, a memory 124 that stores a program 126, and a suitable RF transceiver 128. The base station 120 is coupled via a data path 130 to the RNC 140 that also includes a data processor 142 and a memory 144 storing an associated program 146. At least the programs 116 and 126 are assumed to include program instructions that, when executed by the associated data processor, enable the electronic device to operate in accordance with the exemplary embodiments of this invention, as will be discussed below in greater detail.

In general, the various embodiments of the user equipment 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, Music storage and playback appliances having wireless communication capabilities, Internet appliances permitting wireless Internet access and browsing, as well as portable units or terminals that incorporate combinations of such functions.

The embodiments of this invention may be implemented by computer software executable by the data processor 112 of the user equipment 110 and the other data processors, or by hardware, or by a combination of software and hardware.

The memories 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The data processor 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention use a preamble with FDM PSCH and SSCH sequences that are transmitted once per frame. The frame length is, as a non-limiting example, 10 ms and the preamble size is, as a non-limiting example, one OFDM symbol (see, for example, the above-noted "Physical Channels and Multiplexing in Evolved UTRA DL", NTT DoCoMo, WG1 Ad Hoc on LTE UTRA, R1-050590, Sophia Antipolis, France, 20-21 Jun. 2005).

In accordance with the exemplary embodiments of the invention a short system information payload is provided to allow base station 120 identification and to indicate where additional system information can be read during initial acquisition. Alternatively, a small common data payload may be broadcast instead of system information.

Figure 2:
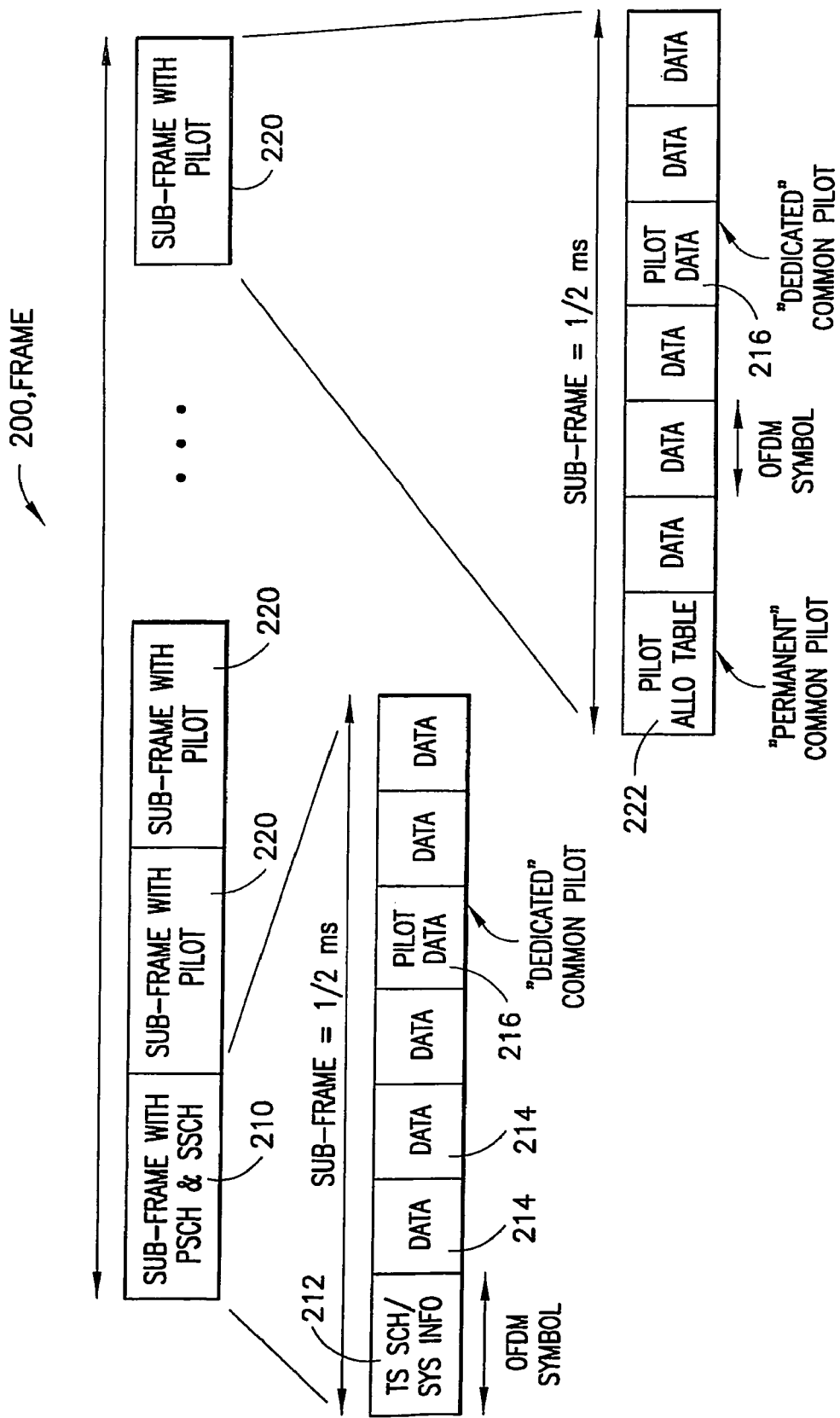
FIG. 2 illustrates an embodiment of a DL frame.

FIG. 2 shows an exemplary embodiment of a DL (e.g., a 3.9G) frame comprised of 20 sub-frames, where a first sub-frame 210 is a sub-frame with the PSCH and SSCH containing TS SCH/Sys Info (one OFDM symbol) and a "dedicated" common pilot 216 (one OFDM symbol), and remaining sub-frames 220 containing a "permanent" common pilot 222 (one OFDM symbol) and the dedicated common pilot 216.

Figure 3:
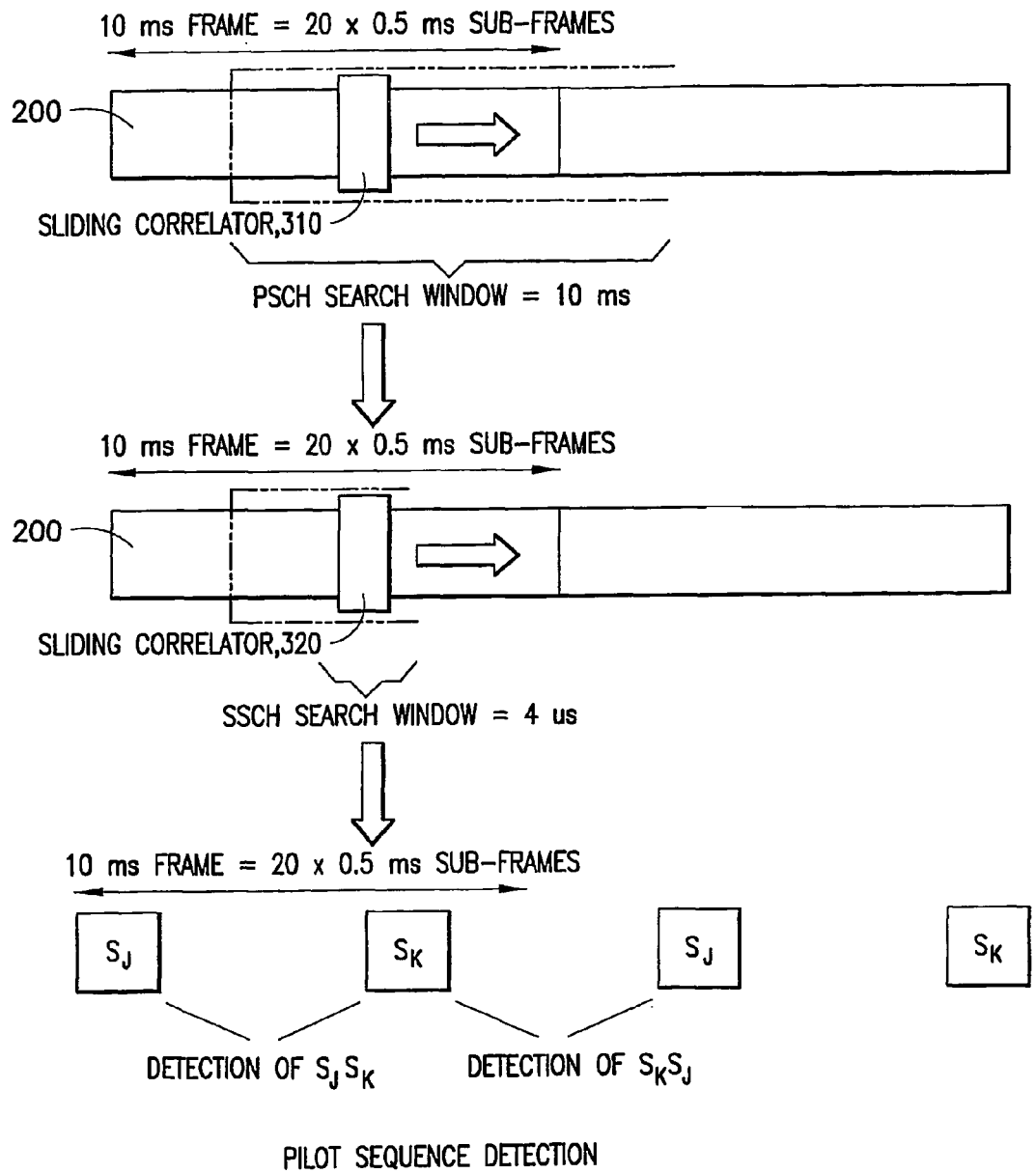
FIG. 3 illustrates the operation of PSCH, SSCH, and Pilot Sequence Detection Algorithms.

Referring now as well to FIG. 3, initial cell search and timing synchronization is achieved by means of a sliding cross-correlation operation using a sliding cross-correlator 310 in the time domain between the received signal and a single stored reference PSCH sequence 117A (stored in the memory 114 of the user equipment 110). The PSCH search window is equal to one frame length. For best performance, it is preferred to average correlator peaks over two consecutive frames.

The SSCH comprises a sequence in an orthogonal sequence set. Each SSCH sequence is detected by means of a sliding cross-correlation operation using a sliding cross-correlator 320 in the frequency domain between the received signal and stored reference SSCH sequences 117B (stored in the memory 114). The search window is preferably marginally greater than an OFDM symbol to allow for residual coarse timing errors (typically of the order of a cyclic prefix or less). As the cross-correlation is performed in the frequency domain, a FFT operation on the received signal is preferred for use for each position in the SSCH search window.

Pilot sequence detection is achieved by detecting a cyclically invariant pair of SSCH transmitted over two consecutive frames.

As an example, consider a set of 16 orthogonal sequences. This allows for 16*16/2=128 cyclically invariant pairs of SSCH transmitted over two consecutive 10 ms frames. This number of SSCH pairs is sufficient to identify 128 pilot sequences. Using instead a set of 32 orthogonal sequences would allow identification of 512 pilot sequences, with some increase in complexity.

PSCH detection uses a search window of one frame length. For best performance, some amount of limited averaging over two consecutive frames may be preferred to meet 3.9G requirements. The buffering requirement increases with the signal bandwidth (i.e. higher sampling frequency). The required buffering can be kept at reasonable by storing the output of the moving cross-correlator and using efficient packing for efficient DSP memory management. Eight bits per correlator output may be sufficient with adequate fixed-point arithmetic scaling. Note, however, that this is needed only at initial acquisition and to prepare the user equipment 110 for handover, and may be performed once per 10 ms frame for at least two consecutive frames.

SSCH detection uses the FFT for each shift of the sliding correlation window, with a number of shifts being approximately 30-120 depending on the signal bandwidth. This operation is also needed only at initial acquisition and is performed once per 10 ms frame for at least two consecutive frames.

As pilot detection only involves detection of the SSCH, the logical structure and scheduling is simplified as only the preamble needs processing.

The exemplary embodiments of this invention can be implemented in the baseband by means of a DP 112, the memory 114 and preferably a FFT HW accelerator, though the use of a fast DSP may permit the use of a FFT DSP SW implementation, and eliminate the need for the HW accelerator.

With regard to synchronization to the RAN, and assuming initial synchronization (strongest cell), the user equipment 110 reads PSCH for initial coarse synchronization, reads the SSCH for a pilot sequence group and improved coarse synchronization, decodes the short System info to confirm a valid PSCH and SSCH. For a cell search procedure the RF carriers of neighboring cells are indicated in serving cell system information, and the user equipment 110 reads the PSCH and SSCH to obtain coarse timing and the pilot sequence group of neighboring cells, decodes the short System info to confirm a valid PSCH and SSCH, and estimates the timing for a stronger signal and a weaker signal. Synchronization can be maintained using fine synchronization results.

In an exemplary 3.9G synchronization approach, user equipment 110 measurement messages for intra-mode handover (800 ms to report one cell out of 32 cells; 200 ms measurement period) include Ec/Io, signal strength measurement (without interference), and relative timing information (handover). Measurements can be made during DRX (intra-carrier and inter-carrier) and active mode (intra-carrier). Pre-synchronization uses a coarse time synchronization on neighbor cell TSs. For the cell search the neighboring cell carriers are indicated in system information, and the primary channel and secondary SCH may occur every 10 ms, similar to the WCDMA structure. There may be a single TS for the primary and 16 TS sequences for the secondary SCH (32 TSs may also be employed). The Secondary SCH (SSCH) provides knowledge of cell-dependent pilots for channel estimation, while FDM PSCH (or SSCH) and Short System information is provided. in one OFDM symbol. Carrier pre-synchronization may not be required as the base station 120 carrier is typically very accurate. For coarse synchronization, the time synchronization uses the PSCH with cross-correlation over two 10 ms frames, where the SSCH can also be used to refine the coarse estimate. Frequency synchronization uses the PSCH and the SSCH, where an absolute error of up to 2.5 ppm (5 kHz error at 2 GHz) may be assumed by a WCDMA implementation. The fine time and frequency synchronization to maintain time and carrier synchronization may use TS+CP+pilot based (capture range is +Tsymbol/2 and +Δf/2).

As is shown in FIG. 2, the sub-carrier allocation to PSCH, SSCH, and System info is provided in the first OFDM symbol in the first sub-frame 210 in the 10 ms frame 200. The PSCH TS and SSCH are each mapped to, for example, 128 sub-carriers, respectively, for an exemplary 5 MHz system (300 active sub-carriers). The Short System information is mapped to, for example, 44 sub-carriers in the first OFDM symbol to indicate at least a base station 120 identifier code. Additional System information may be transmitted in the sub-frame as indicated by Short System information. Common data may also be mapped to these sub-carriers.

For achieving pilot sequence identification for channel estimation, the user equipment 110 reads the SSCH in two consecutive 10 ms frames to obtain knowledge of the pilot sequence for channel estimation. For example, 32 pilot sequences can be identified by $S_jS_k/2$ (2 SSCHs) cyclically invariant pairs of SSCH, assuming eight TSs for SSCH (or 128 if one assumes 16 TSs for SSCH). In alternative embodiments, the user equipment 110 may read one SSCH in one 10 ms frame to identify a pilot sequence group, and then determine the pilot sequence in the group by testing each pilot sequence in the group (pilot symbols), or the user equipment 110 may assume the use of no SSCH, and just use pilot symbols. The SSCH used for channel estimation in preferably located in the first sub-frame 100 in the 10 ms frame, as shown in FIG. 2.

In the exemplary embodiments of this invention the first sub-frame 210 includes the relatively small payload for system information and pilot sequence group identification.

Figure 4:
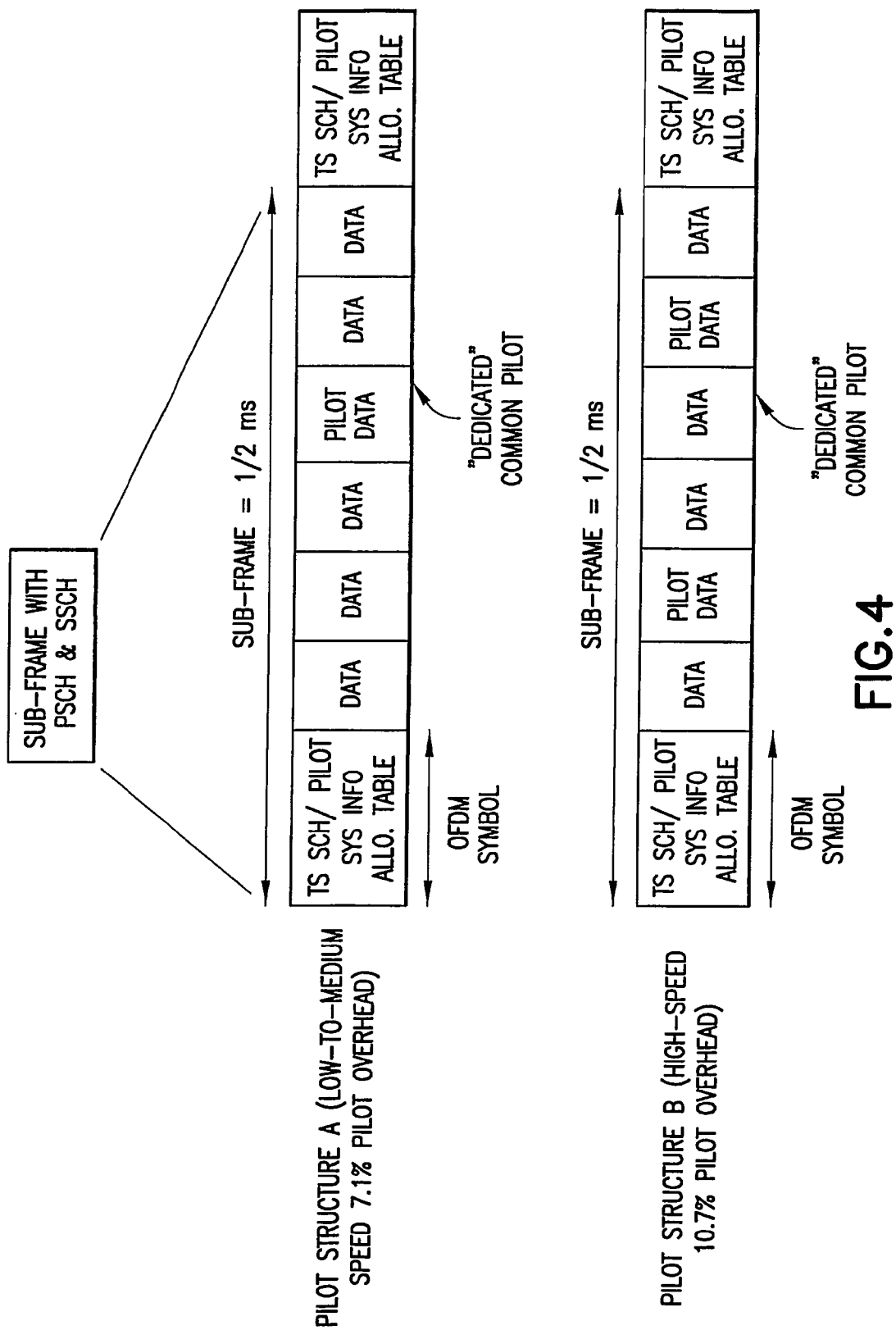
FIG. 4 shows exemplary low-to-medium and high speed pilot structures.
Figure 5B:
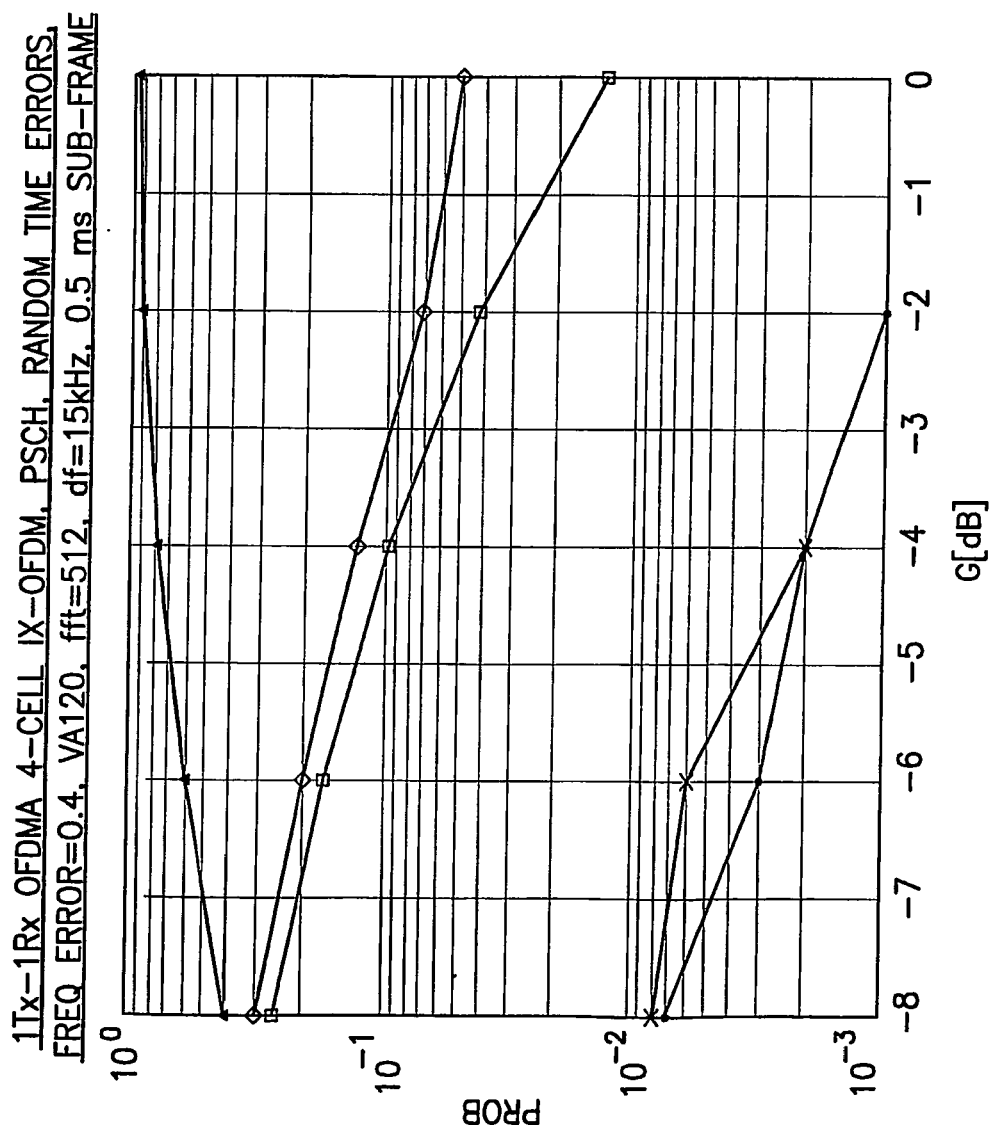
Figure 5C:
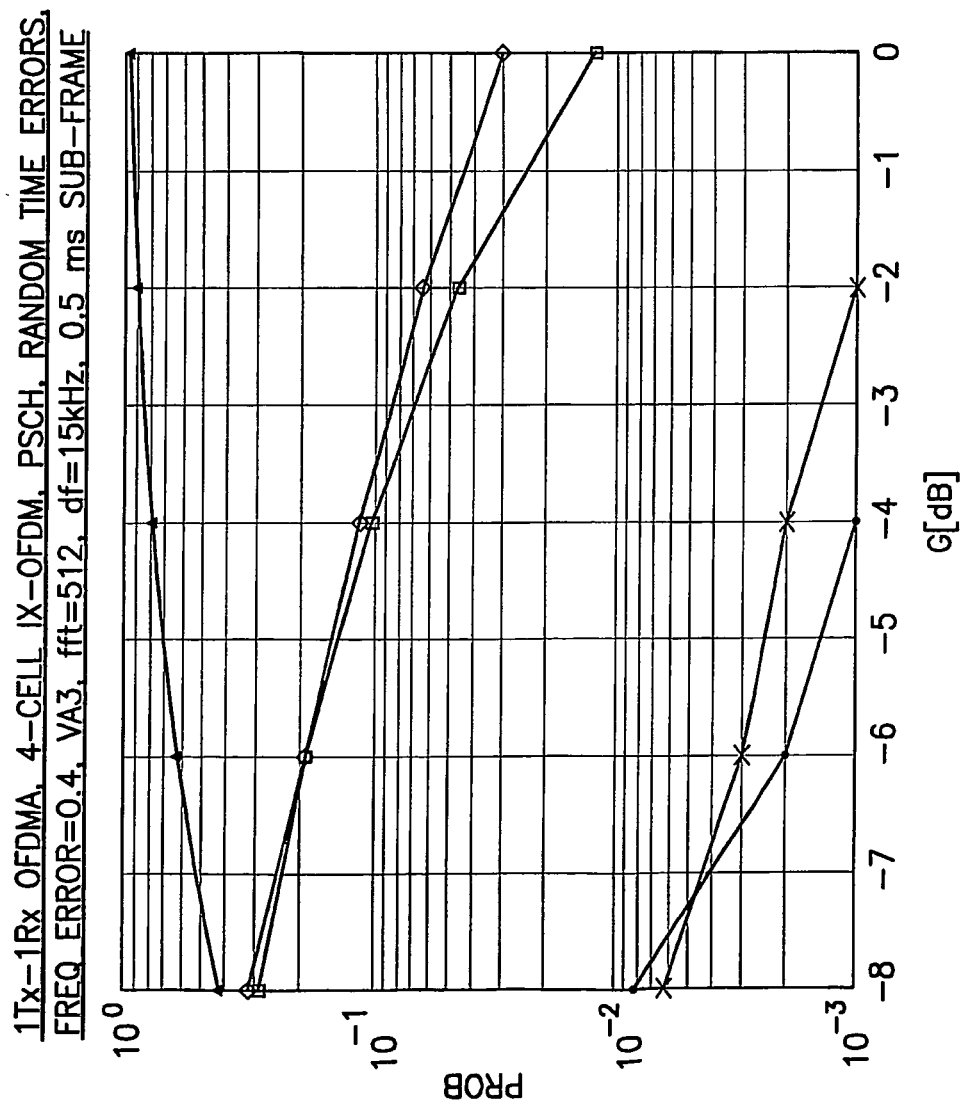
Figure 5D:
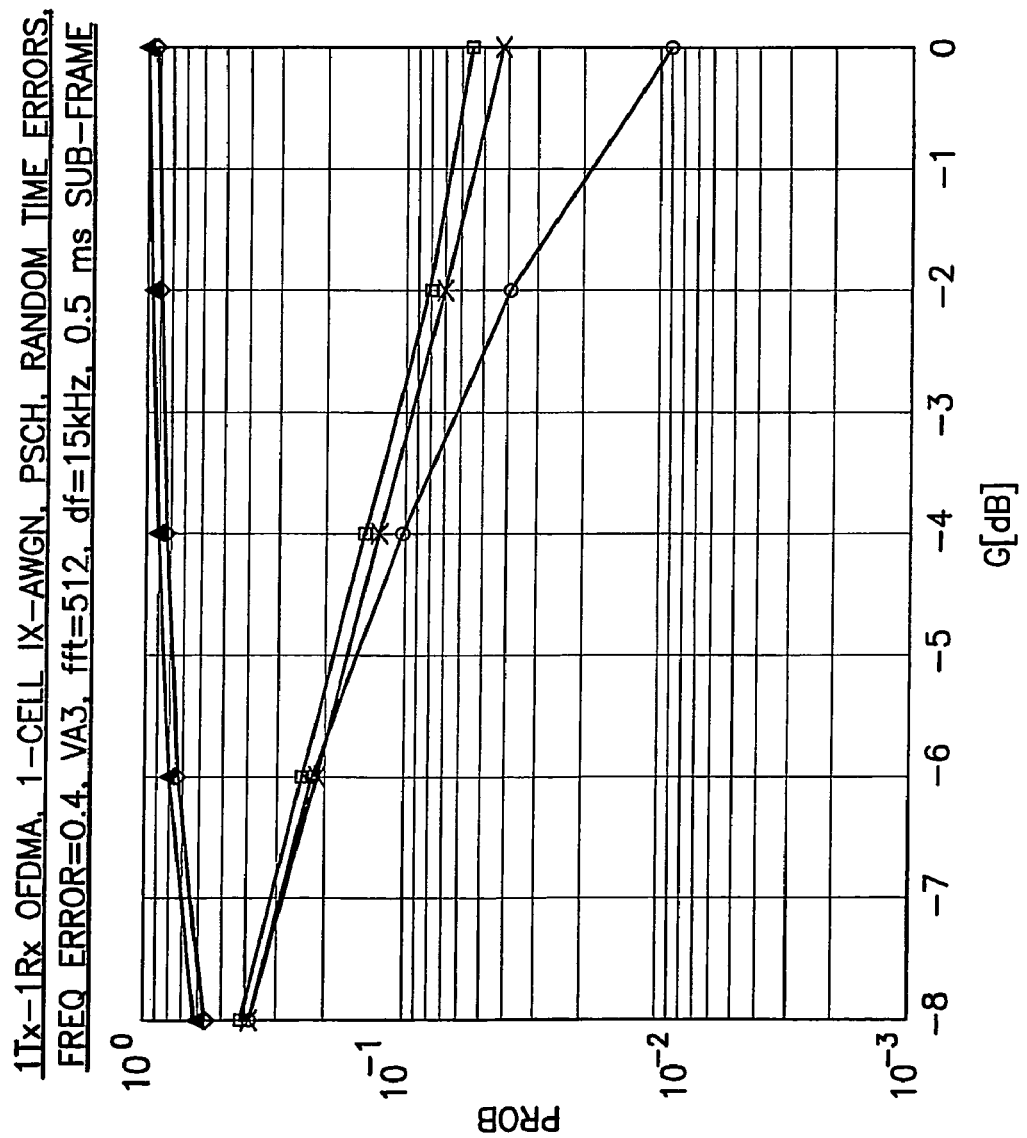

Referring to FIG. 4, it can be noted that network operators may dimension the network with necessary pilot overhead depending on cell type in a fixed-manner (i.e., not user dependent). For example, pilot structure A may be employed in low-to-moderate speed scenarios (e.g., hot spots, urban, wide area), while pilot structure B may be employed in high-speed scenarios (e.g., in a cell that covers a high-speed train track). In pilot structure A the user equipment 110 may process only the first symbol in the sub-frame 210 to decode the System information and allocation table to determine if data is intended for the user equipment 110. This improves baseband efficiency and aids in DRX. The user equipment 110 may be assumed to have knowledge that pilot structures A and B are used in two different ways, during handover and by reading the System information (channel estimates from the TS at the beginning of the frame may be used for channel equalization). Note also that the TS SCH or pilot of the next sub-frame may be used for channel estimation to further improve performance.

Referring again to FIG. 3 with reference to the PSCH, SSCH, and Pilot Sequence Detection algorithms, assume as a non-limiting example a 5 MHz bandwidth with 300 active sub-carriers, a 10 ms frame, 0.5 ms sub-frame, FFT size 512, and a subset of 16 120-length Hadamard sequences. The Primary SCH, Secondary SCH, and short system info (or common data) are transmitted every 10 ms frame in the first OFDM symbol in the frame (preamble). The PSCH uses a single sequence of length 150 which is BPSK modulated and mapped to 150 sub-carriers. The SSCH uses one Hadamard sequence of length 128 in a subset of 16 (one or more additional sequences in the Hadamard set could be used depending on complexity) which is BPSK modulated and mapped to 128 sub-carriers. The remaining 22 sub-carriers are allocated to system info or common data.

The PSCH detection algorithm uses cross-correlation in the time domain with a sliding correlator of 576 samples (preamble size), 10 ms search window and peaks averaged over two consecutive 10 ms frames. The SSCH sequence detection uses cross-correlation in the frequency domain with a sliding correlator of 128 symbols (after FFT) in a shorter window of length that is approximately that of the Cyclic Prefix. The detection of SSCH $S_j$ and $S_k$ transmitted over two consecutive 10 ms frames identifies the pilot sequence used for channel estimation. Further in this regard up to $S_jS_k/2=64$ pilot sequence can be identified by detecting $S_jS_k/2$ (2 SSCHs) cyclically invariant pairs of SSCH, where $S_j$ and $S_k$ have values in 1, 2, . . . , 16. As was noted, with $S_j$ and $S_k$ having values in 1, 2, . . . , 32, up to 512 pilot sequences can be identified.

A simulation was performed to show the benefits of the use of the foregoing exemplary embodiments of the invention. The simulator parameters includes a 15 kHz subcarrier separation, 300 active sub-carriers for 5 MHz bandwidth (0.9 bandwidth efficiency), 2*3.84 MHz FFT sampling frequency and 512 FFT size, and a sub-frame length of 0.5 ms with seven OFDM symbols/sub-frame. In addition, used was a CP=64 samples/8.33 microseconds (first symbol in sub-frame) and a CP=32 samples/4.16 microseconds (for remaining symbols in the sub-frame).

An isolated-cell scenario (sensitivity) was assumed, as was a 4-cell scenario, wherein an independent time offset for each cell (serving and neighbors) was used, the coarse estimator moving search window size was one 10 ms frame length (to allow a search of the strongest cell within the frame), and a geometry value G was made equal to $I_{own}/(I_{other}+N_{awgn})$. The DIR value=3 dB (1 stronger interferer and two equal weaker interferers), and the noise power (IX AWGN interferers) was 80% of ($I_{other}+N_{awgn}$) e.g. G=−7 dB, $I_{own}$=0 dB, $N_{awgn}$=6 dB, $I_{other}$=0 dB (I1=−1.75 dB, I2=I3=−7.77 dB).

Reference is made to FIGS. 5A, 5B, 5C and 5D for showing the results of the simulation assuming thee different velocities of the user equipment 110. With regard to the PSCH detection in the multi-cell scenario, the strongest cell is detected by PSCH, and the probability of false detection was found to be 10% or less at average G~−4 dB. If the detection fails (SSCH and Syst info will also fail), then PSCH detection can be performed again with a probability of two consecutive PSCH detection failure being about 1% at an average G~−4 dB. The high-velocity scenarios show some loss due most likely to averaging. The mean and SD estimator errors are small when successful cell detection (<3 sample and <1 sample, respectively).

With regard to SSCH detection performance, the simulation assumed the 4-cell scenario plus (strong) AWGN to model other smaller interferers and thermal noise (UE on edge of the cell), VA channel profiles and velocities up to 350 km/h, a frequency offset of about half a sub-carrier spacing, random time delays of up to 10 ms, and G=−6 dB, the SSCH correct detection was found to be about 80% (and about 90% at G=−4 dB). With the isolated cell, the SSCH detection rate is about 60% for G=−6 dB (and about 70% at G=−4 dB). The drop in performance may be due to the wide variation in signal strength due to the channel (10 dB or more can be readily observed in VA profile).

If one assumes an 80% probability of correct SSCH detection, the probability of correctly identifying the pilot sequence is equal to the joint probability of having two consecutive successful SSCH detections, and is thus about 64% (0.8*0.8). This implies that about 96% of user equipments 110 achieve cell acquisition within 60 ms (as the probability of not detecting successfully a pair of SSCH after three attempts is 0.36*0.36*0.36=4%). With a 70% probability of correct SSCH detection, the joint probability of having two consecutive successful SSCH detections is about 49%, and thus about 87% of UEs achieve cell acquisition within 60 ms.

Note that the exemplary embodiments may be used in conjunction with other synchronization techniques (see, for example, the above-noted "Physical Channels and Multiplexing in Evolved UTRA DL", NTT DoCoMo, WG1 Ad Hoc on LTE UTRA, R1-050590, Sophia Antipolis, France, 20-21 Jun. 2005).

Note further that the cell acquisition techniques in accordance with the invention use only a relatively small set of orthogonal sequences, which implies a reduced complexity.

Figure 6:
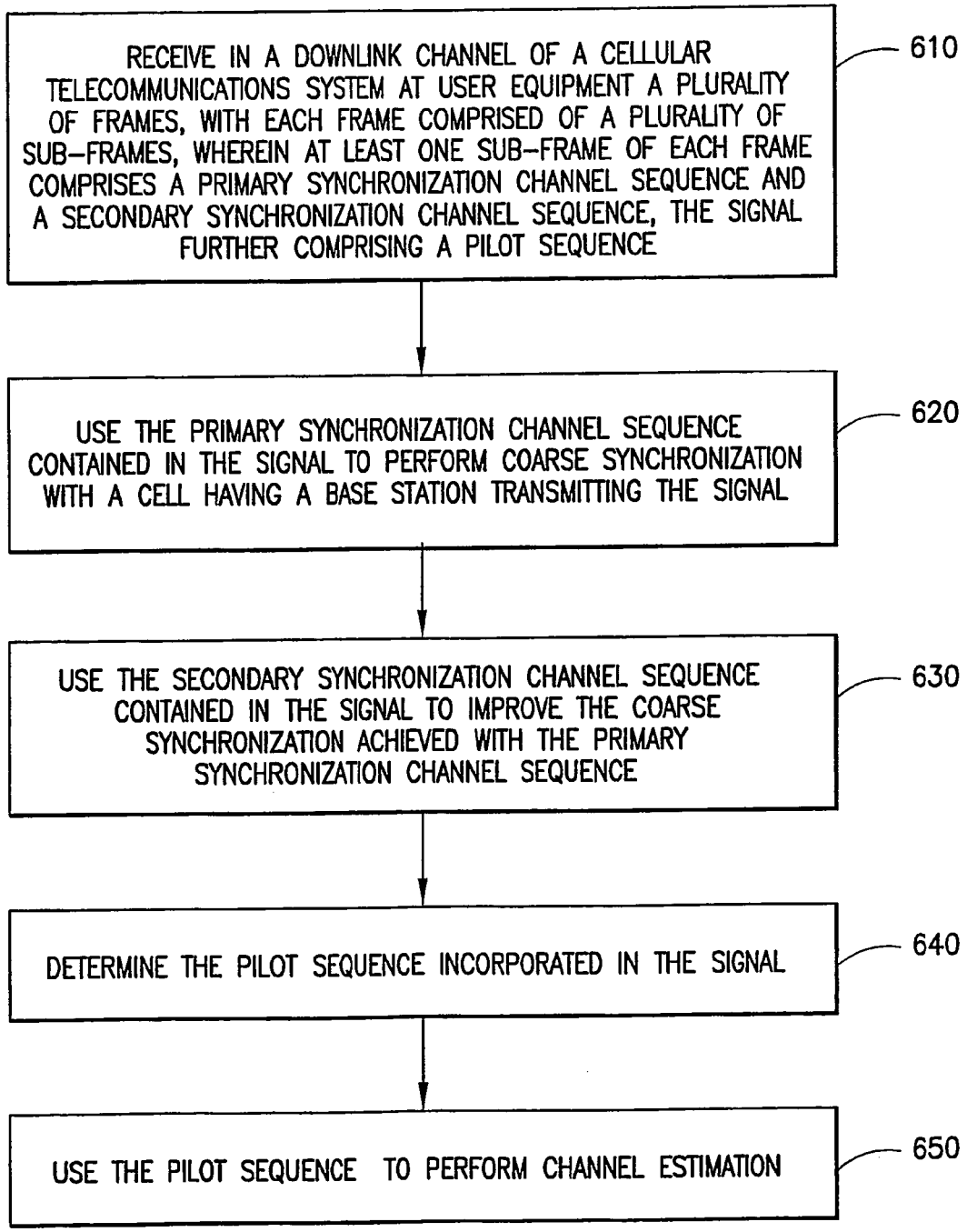
FIG. 6 depicts a method operating in accordance with the invention.
Figure 7:
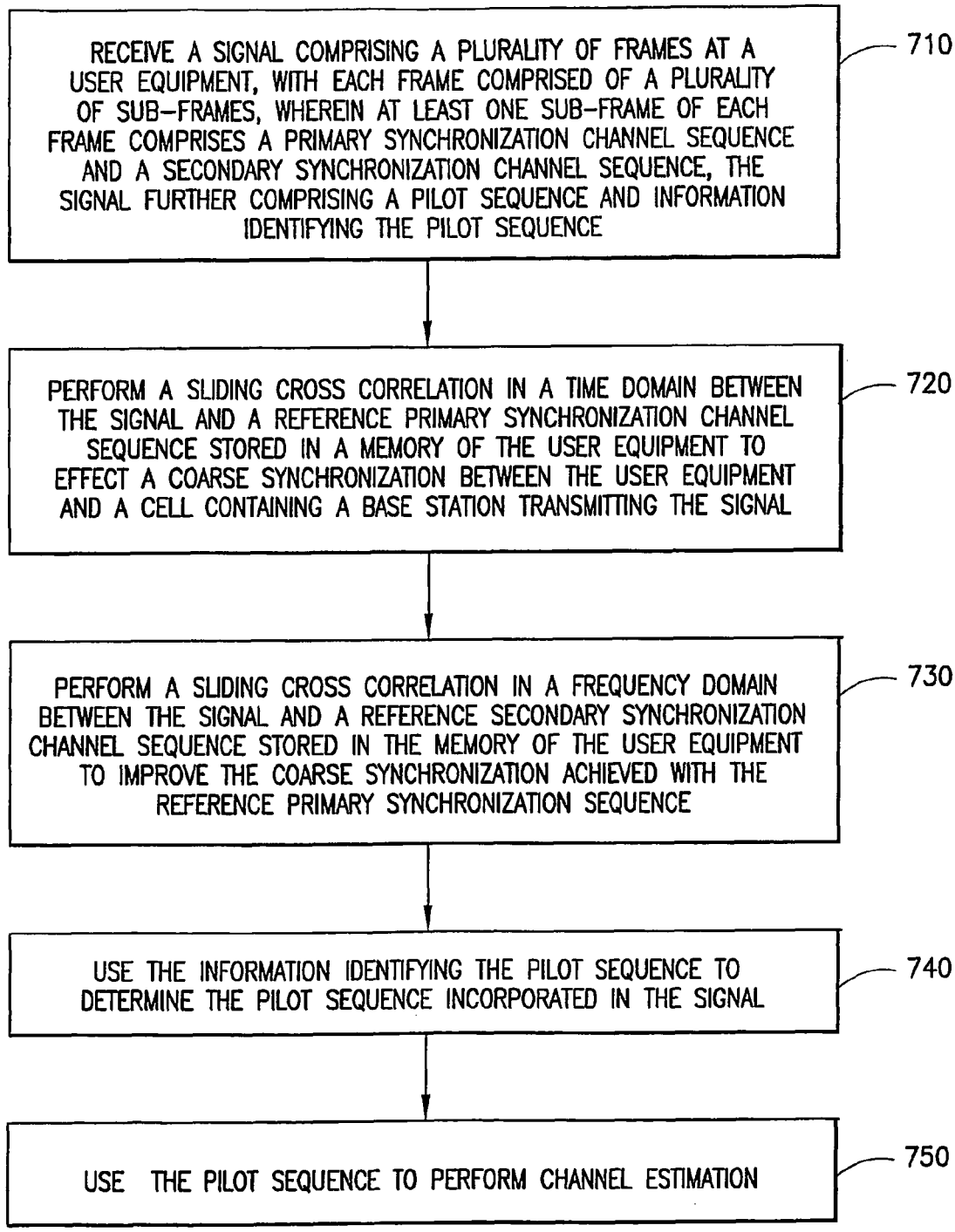
FIG. 7 depicts another method operating in accordance with the invention.

FIGS. 6 and 7 are flow charts summarizing methods operating in accordance with the invention. In FIG. 6, at step 610, a signal is received at user equipment. The signal is transmitted in a downlink channel of a cellular telecommunications system. The signal comprises a plurality of frames, with each frame comprised of a plurality of sub-frames, wherein at least one sub-frame of each frame comprises a primary synchronization channel sequence and a secondary synchronization channel sequence. The signal further comprises a pilot sequence. Next, at step 620, signal processing circuitry of the user equipment uses the primary synchronization channel sequence contained in the signal to perform coarse synchronization with a cell having a base station transmitting the signal. Then, at step 630, signal processing circuitry of the user equipment uses the secondary synchronization channel sequence contained in the signal to improve the coarse synchronization achieved with the primary synchronization channel sequence. Next, at step 640, signal processing circuitry of the user equipment determines the pilot sequence incorporated in the signal. Then, at step 650, the signal processing circuitry of the user equipment uses the pilot sequence to perform channel estimation.

In the method of FIG. 7, at step 710 user equipment operating in a cellular telecommunications network receives a signal transmitted by a base station. The signal comprises a plurality of frames, with each frame comprised of a plurality of sub-frames. At least one sub-frame of each frame of the signal comprises a primary synchronization channel sequence and a secondary synchronization channel sequence. The signal further comprises a pilot sequence and information identifying the pilot sequence. Next, at step 720, signal processing circuitry of the user equipment performs a sliding cross correlation in a time domain between the signal and a reference primary synchronization channel sequence stored in a memory of the user equipment to effect a coarse synchronization between the user equipment and a cell containing the base station transmitting the signal. Then, at step 730, signal processing circuitry of the user equipment performs a sliding cross correlation in a frequency domain between the signal and a reference secondary synchronization channel sequence stored in the memory of the user equipment to improve the coarse synchronization achieved with the reference primary synchronization code. Next, at step 740, signal processing circuitry of the user equipment uses the information identifying the pilot sequence to determine the pilot sequence incorporated in the signal. Then, at step 750, signal processing circuitry of the user equipment uses the pilot sequence to perform channel estimation.

In one variant of the method depicted in FIG. 7, the information identifying the pilot sequence comprises a cyclically invariant pair of secondary synchronization channel sequences transmitted in consecutive frames of the signal. The cyclically invariant pair of secondary synchronization channel sequences are selected from a set of orthogonal sequences. Each pair selected from the set corresponds to, and identifies a particular pilot sequence incorporated in the signal. When a particular pair of secondary synchronization channel sequences is detected as being transmitted in the signal, it is then known that a particular pilot sequence corresponding to that pair is also being transmitted in the signal and is available for channel estimation purposes.

Based on the foregoing it should be apparent that the exemplary embodiments of this invention provide a method, apparatus and computer program product(s) to transmit once per frame a PSCH and a SSCH. A System Information payload may also be provided to enable BS identification and to indicate where additional system information can be read during initial acquisition. Initial cell search and timing synchronization is achieved by means of a sliding cross-correlation operation in the time domain between the received signal and a stored reference PSCH sequence, and a sliding cross-correlation operation in the frequency domain between the received signal and stored reference SSCH sequences, where pilot sequence detection is achieved by detecting a cyclically invariant pair of SSCH transmitted over two consecutive frames.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving in a downlink channel of a cellular telecommunications system at user equipment a signal comprising a plurality of frames, with each frame comprised of a plurality of sub-frames, wherein at least one sub-frame of each frame comprises a primary synchronization channel sequence and a secondary synchronization channel sequence, the signal further comprising a pilot sequence;
   using the primary synchronization channel sequence contained in the signal to perform coarse synchronization with a cell having a base station transmitting the signal;
   using the secondary synchronization channel sequence contained in the signal to improve the coarse synchronization achieved with the primary synchronization channel sequence;
   determining the pilot sequence incorporated in the signal; and
   using the pilot sequence to perform channel estimation.

2. The method of claim 1, where the cellular0. telecommunications system is an orthogonal frequency division multiplexing cellular telecommunications system.

3. The method of claim 2, where the sub-frame comprising the primary synchronization channel sequence is one orthogonal frequency division multiplexing symbol wide.

4. The method of claim 1, where using the primary synchronization channel sequence to perform coarse synchronization further comprises:
   performing a sliding cross correlation in a time domain using a reference primary synchronization channel sequence stored in a memory of the user equipment.

5. The method of claim 4, where a window used when performing the sliding cross correlation is one frame wide.

6. The method of claim 4, where correlator peaks generated during the sliding cross correlation operation are averaged over two frames.

7. The method of claim 1, where using the secondary synchronization channel sequence to improve the coarse synchronization achieved with the primary synchronization channel sequence further comprises:
   performing a sliding cross correlation in a frequency domain using a reference secondary synchronization channel sequence stored in a memory of the user equipment.

8. The method of claim 7, where the secondary synchronization channel sequence is selected from an orthogonal sequence set.

9. The method of claim 8, where the signal further comprises information identifying the pilot sequence contained in the signal, and where determining the pilot sequence incorporated in the signal further comprises identifying the pilot sequence using the information.

10. The method of claim 9, where the information identifying the pilot sequence comprises a cyclically invariant pair of secondary synchronization channel sequences transmitted in sub-frames of two consecutive frames of the signal, where the cyclically invariant pair correspond to a particular pilot sequence, and where determining the pilot sequence incorporated in the signal further comprises:

identifying the cyclically invariant pair of secondary synchronization channel sequences transmitted in two consecutive frames and, in turn, the particular pilot sequence corresponding to the cyclically invariant pair of secondary synchronization channel sequences.

11. The method of claim 10, where the secondary synchronization channel sequences comprising the cyclically invariant pair are selected from a set of 16 orthogonal sequences, allowing identification of 128 different pilot sequences when pairs of cyclically invariant secondary synchronization channel sequences are selected from the set of 16 orthogonal sequences and transmitted in consecutive frames for the purpose of identifying pilot sequences.

12. The method of claim 10, where the secondary synchronization channel sequences comprising the cyclically invariant pair are selected from a set of 32 orthogonal sequences, allowing identification of 512 different pilot sequences when pairs of cyclically invariant secondary synchronization channel sequences are selected from the set of 32 orthogonal sequences and transmitted in consecutive frames for the purpose of identifying pilot sequences.

13. The method of claim 1, where the signal comprises a frequency division multiplex signal and where the primary and secondary synchronization channel sequences are multiplexed to a plurality of sub-carriers of the frequency division multiplex signal.

14. The method of claim 1, where the signal further comprises a telecommunications system payload containing base station identification information.

15. The method of claim 14, further comprising: decoding the base station identification information to confirm a valid primary synchronization channel sequence and a secondary synchronization channel sequence.

16. The method of claim 14, where the method is used for cell search, where the base station identification information further identifies the carriers of neighboring cells, and where the method is repeated for each neighboring cell to perform coarse synchronization and channel estimation.

17. The method of claim 1, where the signal further comprises a common data payload.

18. The method of claim 1, where the signal further comprises a permanent common pilot.

19. The method of claim 1, where the signal further comprises a dedicated common pilot.

20. An apparatus comprising:

a memory configured to store a program and reference primary and secondary synchronization channel sequence information;

a data processor configured to execute the program to cause the apparatus to at least:

receive a signal comprising a primary synchronization channel sequence and a secondary synchronization channel sequence, the signal further comprising a pilot sequence;

use the primary synchronization channel sequence to perform coarse synchronization with a cell having a base station transmitting the signal;

use the secondary synchronization channel sequence to improve the coarse synchronization achieved with the primary synchronization channel sequence;

determine the pilot sequence incorporated in the signal; and use the pilot sequence to perform channel estimation.

21. The apparatus of claim 20 configured to be used in an orthogonal frequency division multiplexing telecommunications system.

22. The apparatus of claim 20, where the signal comprises a plurality of frames, with each frame comprised of a plurality of sub-frames, wherein at least one sub-frame of each frame contains the primary synchronization channel sequence and the secondary synchronization channel sequence.

23. The apparatus of claim 21, where the use of the primary synchronization channel sequence to perform coarse synchronization further comprises:

performing a sliding cross correlation in a time domain between the signal and the reference primary synchronization channel sequence stored in the memory of the apparatus.

24. The apparatus of claim 23, where a window used when performing the sliding cross correlation is one orthogonal frequency division multiplexing frame wide.

25. The apparatus of claim 23, where correlator peaks generated while performing the sliding cross correlation between the received signal and the primary synchronization reference channel sequence are averaged over two frames.

26. The apparatus of claim 20, where the use of the secondary synchronization channel sequence to improve the coarse synchronization achieved with the primary synchronization channel sequence further comprises:

performing a sliding cross correlation in a frequency domain between the signal and the reference secondary synchronization channel sequence stored in the memory of the apparatus.

27. The apparatus of claim 22, where the signal further comprises information identifying the pilot sequence contained in the signal, and where determining the pilot sequence incorporated in the signal further comprises identifying the pilot sequence using the information.

28. The apparatus of claim 27, where the information identifying the pilot sequence comprises a cyclically invariant pair of secondary synchronization channel sequences transmitted in sub-frames of two consecutive frames of the signal, where the cyclically invariant pair correspond to a particular pilot sequence, and where determining the pilot sequence incorporated in the signal further comprises:

identifying the cyclically invariant pair of secondary synchronization channel sequences transmitted in two consecutive frames and, in turn, the particular pilot sequence corresponding to the cyclically invariant pair of secondary synchronization channel sequences.

29. The apparatus of claim 20, where the signal comprises a frequency division multiplex signal and where the primary and secondary synchronization channel sequences are multiplexed to a plurality of sub-carriers of the frequency division multiplex signal.

30. A memory medium tangibly embodying a computer-readable program, the computer-readable program configured to perform operations when executed by a digital processing apparatus, the operations comprising:

receiving a signal comprising a plurality of frames at a user equipment, with each frame comprised of a plurality of sub-frames, wherein at least one sub-frame of each frame comprises a primary synchronization channel sequence and a secondary synchronization channel sequence, the signal further comprising a pilot sequence and information identifying the pilot sequence;

performing a sliding cross correlation in a time domain between the signal and a reference primary synchronization channel sequence stored in a memory of the user equipment to effect a coarse synchronization between the user equipment and a cell containing a base station transmitting the signal;

performing a sliding cross correlation in a frequency domain between the signal and a reference secondary synchronization channel sequence stored in the memory of the user equipment to improve the coarse synchronization achieved with the reference primary synchronization sequence;

using the information identifying the pilot sequence to determine the pilot sequence incorporated in the signal; and using the pilot sequence to perform channel estimation.

31. An apparatus comprising:
a memory for storing a program;
a data processor to execute the program, wherein the program is executed to cause the apparatus to perform operations comprising:
   transmitting a signal, wherein the signal comprises a plurality of frames, with each frame comprised of a plurality of sub-frames, wherein at least one sub-frame of each frame comprises a primary synchronization channel sequence and a secondary synchronization channel sequence, the signal further comprising a pilot sequence and information identifying the pilot sequence, wherein the information identifying the pilot sequence comprises a cyclically invariant pair of secondary synchronization channel sequences transmitted in consecutive frames.

32. Signal processing circuitry for use in user equipment, the signal processing circuitry configured to perform signal processing operations, the signal processing circuitry comprising:
   an input configured to receive a signal, the signal comprising a plurality of frames, with each frame comprised of a plurality of sub-frames, wherein at least one sub-frame of each frame comprises a primary synchronization channel sequence and a secondary synchronization channel sequence, the signal further comprising a pilot sequence and information identifying the pilot sequence;
   a circuit connected to the input and configured to perform a sliding cross correlation in a time domain between the signal and a reference primary synchronization channel sequence stored in a memory of the user equipment to effect a coarse synchronization between the user equipment and a cell containing a base station transmitting the signal;
   a circuit connected to the input and configured to perform a sliding cross correlation in a frequency domain between the signal and a reference secondary synchronization channel sequence stored in the memory of the user equipment to improve the coarse synchronization achieved with the reference primary synchronization sequence;
   a circuit configured to use the information identifying the pilot sequence to determine the pilot sequence incorporated in the signal; and
   a circuit configured to use the pilot sequence to perform channel estimation.

* * * * *